United States Patent [19]

Ohishi

[11] 4,111,550

[45] Sep. 5, 1978

[54] PLATEN COVER FOR PREVENTION OF DISPLACEMENT OF AN ORIGINAL

[75] Inventor: Yoshikatsu Ohishi, Tokyo, Japan

[73] Assignee: Rank Xerox, Ltd., London, England

[21] Appl. No.: 723,103

[22] Filed: Sep. 13, 1976

[30] Foreign Application Priority Data

Oct. 30, 1975 [JP] Japan .................. 50-146999[U]

[51] Int. Cl.² ............................................. G03B 27/62
[52] U.S. Cl. ............................................. 355/75
[58] Field of Search ............... 24/67.11; 355/72, 75, 355/48, 50, 77, 3 R, 125, 131, 92

[56] References Cited

U.S. PATENT DOCUMENTS

| 813,531 | 2/1906 | Spencer | 355/131 |
|---|---|---|---|
| 1,780,701 | 11/1930 | Crane | 355/92 |
| 2,226,157 | 12/1940 | Christie et al. | 355/131 X |
| 2,638,827 | 5/1953 | Leavitt et al. | 355/131 X |
| 2,686,050 | 8/1954 | De Zelar | 355/72 X |
| 3,510,217 | 5/1970 | Cirimele et al. | 355/92 X |
| 3,825,338 | 7/1974 | Kolibas | 355/50 |
| 3,888,585 | 6/1975 | Cross | 355/75 |
| 3,994,582 | 11/1976 | Goshima et al. | 355/75 |

FOREIGN PATENT DOCUMENTS

| 1,053,357 | 9/1953 | France | 355/75 |
|---|---|---|---|
| 1,473,086 | 2/1967 | France | 355/75 |

*Primary Examiner*—Donald A. Griffin
*Attorney, Agent, or Firm*—J. J. Ralabate; C. A. Green; H. Fleischer

[57] ABSTRACT

A copier platen cover, adapted to prevent displacement of an original document as the platen cover is closed, comprising, on the side of the cover which contacts the original, an elastic layer having at least one raised portion.

1 Claim, 5 Drawing Figures

PLATEN COVER FOR PREVENTION OF DISPLACEMENT OF AN ORIGINAL

BACKGROUND OF THE INVENTION

This invention relates to a platen cover for prevention of displacement of an original, and more particularly, to a platen cover for preventing displacement of an original in electrophotographic copiers or the like.

In electrophotographic copiers or the like, a platen cover is provided so that an original may be placed in intimate contact with a platen glass positioned in focus of an optical system. An elastic member is attached to the inside of the platen cover, that is, to the entire surface of the side which contacts an original, and generally a white sheet material is placed on the elastic member to provide full reflection and prevent black framing in copies of less than full-size originals. With such platen cover, however, when the original is placed on the platen glass and the platen cover is closed, wind pressure induced thereby frequently causes the original to be displaced, often resulting in off-center copying.

The present invention has been realized in view of the above, and it is an object of the invention to provide a platen cover, which is simple in construction but can prevent displacement of an original. According to the features of this invention, an elastic material preferably having a white surface has a raised portion on the side which contacts the original.

DESCRIPTION OF THE INVENTION

Figure 1:
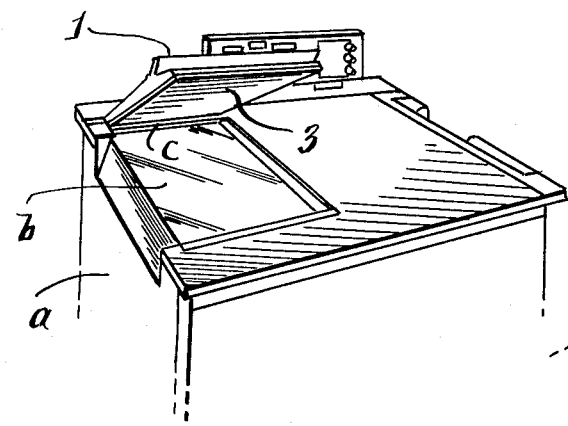
FIG. 1 is a perspective view showing a platen cover mounted.
Figure 2:
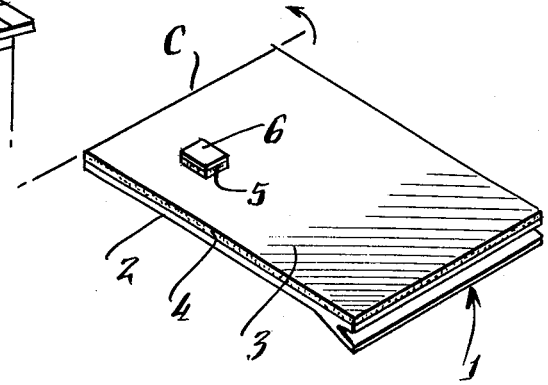
FIGS. 2 to 5 are perspective views each showing an embodiment of a platen cover according to the present invention.
Figure 3:
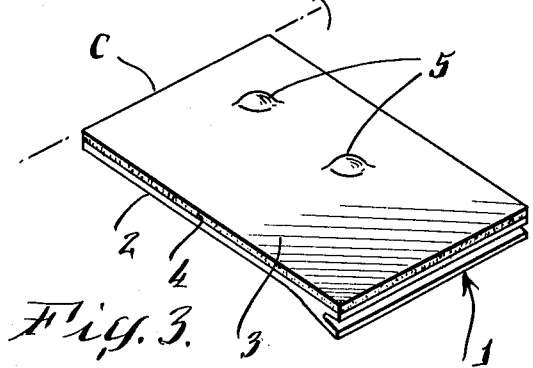
Figure 4:
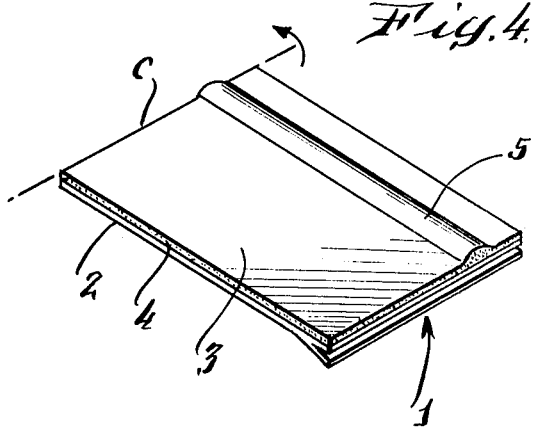
Figure 5:
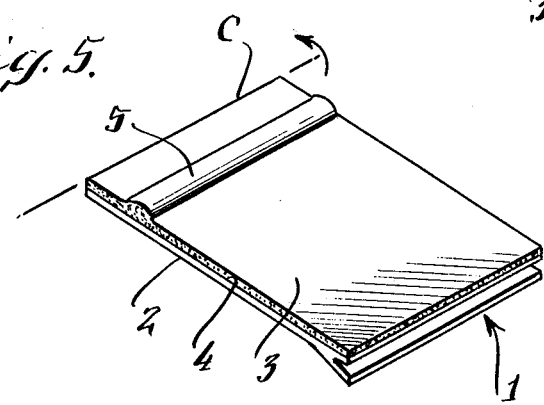

FIG. 1 shows how a platen cover 1, which is openably and closeably mounted by a support portion (c), is mounted on a document platen (b) of an electrophotographic copier (a). As shown in FIG. 2, the platen cover 1 has an elastic member 4 having a white surface 3, the elastic member 4 being positioned on the side of a base plate 2 which contacts the original, and the elastic member 4 has one or more elastic members 5 with a white layer 6 mounted on the surface thereof to form a raised portion. It is to be noted that the raised portion may be formed, as shown in FIG. 3, by partially raising the surface of the elastic member 4 having the white surface 3 positioned thereon, or may be formed, as shown in FIGS. 4 and 5, by raising the surface of the elastic member 4 having the white surface 3 positioned thereon in the form of a mountain or wave. The raised portion 5 is preferably positioned close to the support portion (c) of the platen cover 1 so that the original may be pressed such that the rotational angle of the platen cover 1 is small and additionally the pressing force becomes greater as the cover closes.

In the case of the raised portion 5, as shown in FIGS. 2 and 3, the raised portion 5 can be positioned in a portion such that, even if the original should be varied in size, shade caused by the edge of the elastic member at the time of exposure can thereby be avoided. Also, in the case of the raised portion 5, raised in the form of a mountain or wave as shown in FIGS. 4 and 5, the portion 5 is smoothly raised without having an edge, and when the platen cover is fully closed, the soft elastic member comes into intimate contact with the platen glass, causing no shade at exposure.

I claim:

1. A copier platen cover, adapted to prevent displacement of an original document as the platen cover is closed, comprising, on the side of the cover which contacts the original, an elastic layer having a white surface and at least one raised portion integral with said layer, said raised portion being deformed with the cover in the closed position so that the unraised portion of said layer contacts the original document to secure the original document in intimate contact with the platen minimizing shade at exposure, said raised portion being positioned so that the platen cover rotates through a small angle with the force pressing the original document against the platen increasing as the cover closes.

* * * * *